United States Patent
Wu

(10) Patent No.: US 12,455,171 B2
(45) Date of Patent: Oct. 28, 2025

(54) PROVIDING EARLY LANE NAVIGATION INFORMATION FOR A ROAD CONNECTING SUCCESSIVE INTERSECTIONS

(71) Applicant: Tencent Technology (Shenzhen) Company Limited, Guangdong (CN)

(72) Inventor: Yifei Wu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 438 days.

(21) Appl. No.: 17/978,070

(22) Filed: Oct. 31, 2022

(65) Prior Publication Data

US 2023/0052617 A1   Feb. 16, 2023

Related U.S. Application Data

(63) Continuation of application No. PCT/CN2021/132005, filed on Nov. 22, 2021.

(30) Foreign Application Priority Data

Dec. 30, 2020 (CN) .......................... 202011602176.6

(51) Int. Cl.
    *G01C 21/36* (2006.01)
    *G01C 21/34* (2006.01)

(52) U.S. Cl.
    CPC ..... *G01C 21/3658* (2013.01); *G01C 21/3461* (2013.01); *G01C 21/3492* (2013.01)

(58) Field of Classification Search
    CPC ............ G01C 21/3658; G01C 21/3461; G01C 21/3492; G01C 21/3655; G01C 21/3629
    (Continued)

(56) References Cited

U.S. PATENT DOCUMENTS

| | | | | |
|---|---|---|---|---|
| 2010/0223002 A1* | 9/2010 | Oonichi | ............. | G01C 21/3658 701/437 |
| 2012/0166072 A1* | 6/2012 | Tamaoki | ......... | B60W 30/18154 701/300 |
| 2020/0209007 A1 | 7/2020 | Sasaki et al. | | |

FOREIGN PATENT DOCUMENTS

| | | |
|---|---|---|
| CN | 101517369 A | 8/2009 |
| CN | 102840863 | * 12/2012 |

(Continued)

OTHER PUBLICATIONS

International Search Report and Written Opinion issued in International Application No. PCT/CN2021/132005, mailed Feb. 17, 2022, with English Translation, 15 pages.

*Primary Examiner* — Muhammad Shafi
(74) *Attorney, Agent, or Firm* — ArentFox Schiff LLP

(57) ABSTRACT

A navigation prompt message method includes acquiring a planned driving path including a first intersection and a second intersection to be passed successively. The method further includes, in response to the second intersection being located within a distance threshold of the first intersection, acquiring lane information of a connecting road between the first intersection and the second intersection. In response to the second intersection being located within a distance threshold of the first intersection, the method further includes determining a recommended driving lane on the connecting road based on the lane information, and generating, before a vehicle passes through the first intersection, a navigation prompt message indicating the recommended driving lane the navigation prompt message guiding the vehicle to drive on the recommended driving lane after passing through the first intersection.

16 Claims, 10 Drawing Sheets

(58) Field of Classification Search
USPC .......................................................... 701/423
See application file for complete search history.

(56) References Cited

FOREIGN PATENT DOCUMENTS

| | | |
|---|---|---|
| CN | 102840863 A | 12/2012 |
| CN | 104296767 A | 1/2015 |
| CN | 112710321 A | 4/2021 |
| CN | 112798003 A | 5/2021 |
| JP | 2012137371 A | 7/2012 |

* cited by examiner

PROVIDING EARLY LANE NAVIGATION INFORMATION FOR A ROAD CONNECTING SUCCESSIVE INTERSECTIONS

RELATED APPLICATIONS

This application is a continuation of International Application No. PCT/CN2021/132005, entitled "GENERATION METHOD AND APPARATUS AND REMINDING METHOD AND APPARATUS OF NAVIGATION PROMPT INFORMATION, AND DEVICE", filed on Nov. 22, 2021, which claims priority to Chinese Patent Application No. 202011602176.6, entitled "GENERATION METHOD AND APPARATUS AND REMINDING METHOD AND APPARATUS FOR NAVIGATION PROMPT MESSAGE, AND DEVICE", filed on Dec. 30, 2020. The entire disclosures of the prior applications are hereby incorporated by reference.

FIELD OF THE TECHNOLOGY

Embodiments of this application relate to the technical field of map navigation, including a generation method and apparatus and reminding method and apparatus for a navigation prompt message, and a device.

BACKGROUND OF THE DISCLOSURE

When a user uses a navigation application during driving, the navigation application will broadcast some navigation prompt messages to guide the user to drive on a planned driving path.

For example, in a case that there are two adjacent intersections in front of the user, it is assumed that the user needs to be guided to turn left at the first intersection and then turn right at the second intersection while driving on the planned driving path, the navigation application can broadcast the following navigation prompt message: Turn left at the first intersection ahead, and then turn right at the second intersection.

However, such a navigation prompt message is not detailed enough, resulting in a high yaw rate during the user's driving. For example, after turning left at the first intersection, the user cannot turn right at the second intersection because of not entering a desired right-turn lane, thereby resulting in yawing.

SUMMARY

According to embodiments provided in this disclosure, a generation method and apparatus and reminding method and apparatus for a navigation prompt message, and a device are provided.

In an embodiment, a generation method for a navigation prompt message includes acquiring a planned driving path, the planned driving path comprising a first intersection and a second intersection to be passed successively. The method further includes, in response to a determination that the second intersection is located within a distance threshold of the first intersection, acquiring lane information of a connecting road between the first intersection and the second intersection. The lane information includes a distribution of lanes on the connecting road and at least one driving restriction corresponding to at least one of the lanes on the connecting road. In response to a determination that the second intersection is located within a distance threshold of the first intersection, the method further includes determining a recommended driving lane on the connecting road based on the lane information, and generating, before a vehicle passes through the first intersection, a navigation prompt message indicating the recommended driving lane, the navigation prompt message guiding the vehicle to drive on the recommended driving lane after passing through the first intersection.

In an embodiment, a method for sending a navigation prompt message includes acquiring a navigation prompt message corresponding to a planned driving path, the planned driving path includes a first intersection and a second intersection to be passed successively. The second intersection is located within a distance threshold of the first intersection, and the navigation prompt message is configured to guide a vehicle, before passing through the first intersection, to drive on a recommended driving lane on a connecting road between the first intersection and the second intersection after passing through the first intersection. The method further includes sending out the navigation prompt message before the vehicle reaches the first intersection.

In an embodiment, a generation apparatus for a navigation prompt message includes processing circuitry configured to acquire a planned driving path, the planned driving path comprising a first intersection and a second intersection to be passed successively. The processing circuitry is further configured to, in response to a determination that the second intersection is located within a distance threshold of the first intersection, acquire lane information of a connecting road between the first intersection and the second intersection. The lane information includes a distribution of lanes on the connecting road and at least one driving restriction corresponding to at least one of the lanes on the connecting road. In response to a determination that the second intersection is located within a distance threshold of the first intersection, the processing circuitry is further configured to determine a recommended driving lane on the connecting road based on the lane information, and generate, before a vehicle passes through the first intersection, a navigation prompt message indicating the recommended driving lane, the navigation prompt message guiding the vehicle to drive on the recommended driving lane after passing through the first intersection.

DESCRIPTION OF EMBODIMENTS

To make objectives, technical solutions, and advantages of this disclosure clearer, the following further describes in detail implementations of this disclosure with reference to the accompanying drawings.

Figure 1:
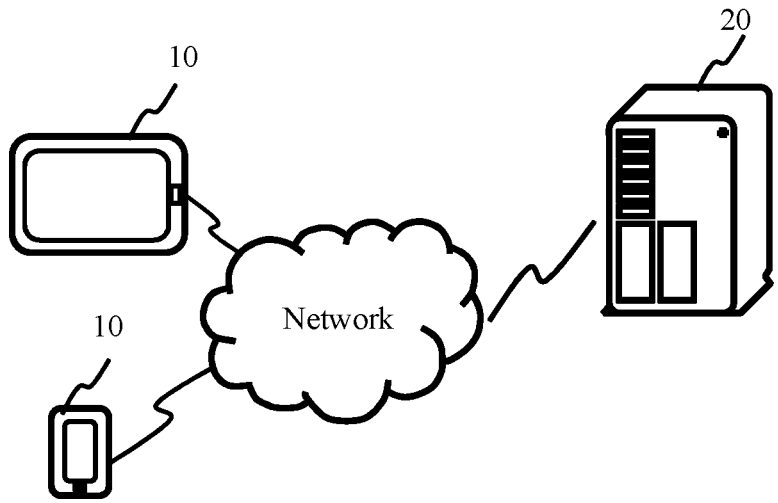
FIG. 1 is a schematic diagram of a solution implementation environment according to an embodiment of this disclosure.

Please refer to FIG. 1 showing a schematic diagram of a solution implementation environment according to an embodiment of this disclosure. The solution implementation environment may implement a system architecture of a navigation application. The implementation environment may include a terminal 10 and a server 20.

The terminal 10 may be electronic devices such as a mobile phone, a tablet computer, a personal computer (PC), a wearable device, on-board equipment or the like. The terminal 10 may be equipped with a client used for running a navigation application or a client used for running an application with a navigation function, by which a user can perform navigation operation. The client may have an interface display function for displaying a navigation prompt message. The client may have a voice broadcast function for playing a navigation prompt message.

The server 20 may be configured to provide a backend service for the client of the application in the terminal 10. For example, the server 20 may be a backend server of the application with the navigation function. The server 20 may be an independent physical server, or may be a server cluster composed of a plurality of physical servers or a distributed system, and may further be a cloud server that provides cloud computing services.

The terminal 10 may communicate with the server 20 by using a network.

In the generation method for a navigation prompt message provided in this disclosure, the steps may be mainly performed by a computer device. The computer device is an electronic device with data calculation, processing, and storage capabilities. The computer device may be the terminal 10 or the server 20. In the reminding method for a navigation prompt message provided in this disclosure, the steps may be mainly performed by the terminal 10.

In an embodiment, the generation method for a navigation prompt message according to an embodiment of this disclosure may use some artificial intelligence (AI) technologies to assist the generation of navigation prompt messages, such as machine learning (ML) technology.

For example, in the method according to an embodiment of this disclosure, the machine learning technology may be used for training to obtain an AI model for generating a path. After that, the AI model may automatically generate a planned driving route of a user according to an origin, a destination and map information provided by the user. For another example, in the method according to an embodiment of this disclosure, the machine learning technology may also be used for training to obtain an AI model used for generating a navigation prompt message. After that, the AI model may automatically generate the navigation prompt message according to some necessary information required for generating the navigation prompt message (such as a recommended driving lane).

The technical solutions of this disclosure are described below by using several embodiments.

Figure 2:
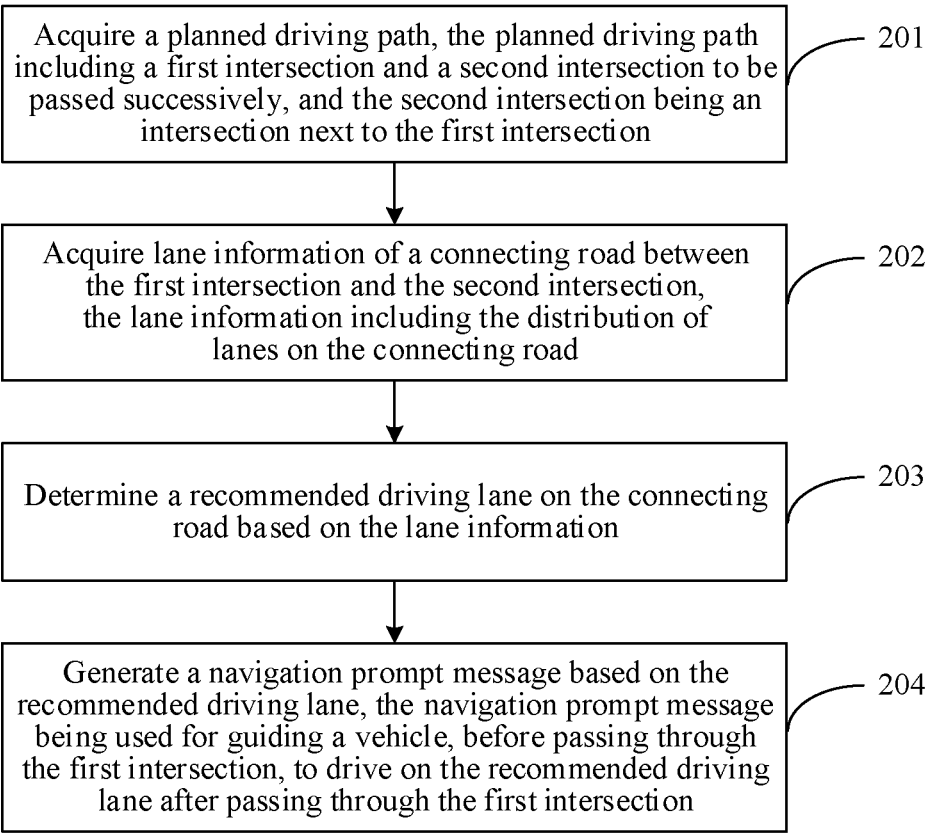
FIG. 2 is a flowchart of a generation method for a navigation prompt message according to an embodiment of this disclosure.

Please refer to FIG. 2 showing a flowchart of a generation method for a navigation prompt message according to an embodiment of this disclosure. The method may include the following steps (201 to 204):

Step 201, acquiring a planned driving path, the planned driving path including a first intersection and a second intersection to be passed successively, and the second intersection being an intersection next to the first intersection.

In the embodiments of this disclosure, a computer device may acquire a planned driving path of a user, where the user may be a user who can use the navigation application at will. By means of the navigation application, the user may obtain a planned driving path for the destination. The planned driving path is a path from an origin to a destination, which is planned based on map data by the navigation application, and may be used for guiding the user to drive from the origin to the destination. The planned driving path may be a preferred path recommended after the navigation application transverses all paths. There may be multiple planned driving paths recommended to the user, and the user may select a target planned driving path as required.

The planned driving path may include multiple intersections, and the user may pass through the intersections in sequence as per the planned driving path. The above-mentioned first intersection may be any one of multiple intersections except for the last intersection. The above-mentioned second intersection may be any one of multiple intersections except for the first intersection. The first intersection is adjacent to the second intersection, and the second intersection is the intersection next to the first intersection. An intersection is a place where roads converge, that is, an intersection of at least two roads. The first intersection and second intersection may be intersections such as crossroads, T-shaped intersections, L-shaped intersections, which are not limited in the embodiments of this disclosure.

Step 202, acquiring lane information of a connecting road between the first intersection and the second intersection, the lane information including the distribution of lanes on the connecting road. For example, in response to a determination that the second intersection is located within a distance threshold of the first intersection, lane information of a connecting road between the first intersection and the second intersection is acquired. The lane information includes a distribution of lanes on the connecting road and at least one driving restriction corresponding to at least one of the lanes on the connecting road.

The connecting road between the first intersection and the second intersection is a road where the user needs to pass from the first intersection to the second intersection. The connecting road may be a road such as a straight road and a curve road.

The lane information refers to distribution information of lanes included on the connecting road. In the embodiments of this disclosure, the computer device may be used for acquiring the lane distribution of the connecting road by means of the lane information. For example, data including the number of lanes, lane types, and passable time of lanes on the connecting road can be acquired by means of the lane information. For example, the connecting road includes three lanes, in which the leftmost lane is a left-turn lane, the middle lane is a straight-through lane, and the rightmost lane is a shared right-turn and straight-through lane. The lane types may include a left-turn lane, a straight-through lane, a right-turn lane, and a U-turn lane. The lane types may also include special lanes, such as a shared lane, a reversible lane, and a bus lane.

Step 203, determining a recommended driving lane on the connecting road based on the lane information. For example, in response to a determination that the second intersection is located within a distance threshold of the first intersection, a recommended driving lane on the connecting road is determined based on the lane information.

The recommended driving lane is a driving lane recommended by the navigation application, which may be used for guiding the user to drive on a corresponding lane on the connecting road. For example, there may be 4 lanes on the connecting road between the first intersection and the second intersection. The navigation application recommends that the user needs to drive on the third land after passing through the first intersection, so as to accurately pass through the second intersection as per the set planned driving path, where the third lane is the recommended driving lane.

In an example, the recommended driving lane may be acquired by the following specific method, that is, determining a recommended driving lane on the connecting road based on the lane information includes: acquiring a planned driving direction at the second intersection; and determining a recommended driving lane on the connecting road based on the lane information of the connecting road and the planned driving direction at the second intersection.

The above-mentioned planned driving direction refers to a user's driving direction at the second intersection, which is determined according to the planned driving path. The user may determine driving operation to be performed at the second intersection based on the planned driving direction and the lane information, that is, determining the recommended driving lane on the connecting road. For example, when the navigation application displays that the planned driving direction of Intersection A is "Turn Left", the user needs to turn left at Intersection A, so as to determine that the recommended driving lane is the left-turn lane on the connecting road. When the navigation application displays that the planned driving direction of Intersection A is "Go Straight Ahead", the user only needs to keep going straight without turning, so as to determine that the recommended driving lane is the straight-through lane on the connecting road.

The recommended driving lane is determined based on the lane information and the planned driving direction at the second intersection, thus improving the accuracy of the determined recommended driving lane. Since the accuracy of the recommended driving lane is improved, the probability of modifying the recommended driving lane may also be reduced, such that the power and computing resources consumed for modifying the recommended driving lane are saved.

The lane information of the connecting road and the planned driving direction at the second intersection may be matched by the following specific method, that is, determining a recommended driving lane on the connecting road based on the lane information and the planned driving direction at the second intersection includes: if the planned driving direction at the second intersection is a right turn, determining that the recommended driving lane is a right-turn lane on the connecting road; if the planned driving direction at the second intersection is a left turn, determining that the recommended driving lane is a left-turn lane on the connecting road; if the planned driving direction at the second intersection is straight, determining that the recommended driving lane is a straight-through lane on the connecting road; and if the planned driving direction at the second intersection is a U turn, determining that the recommended driving lane is a U-turn lane on the connecting road.

Figure 3:
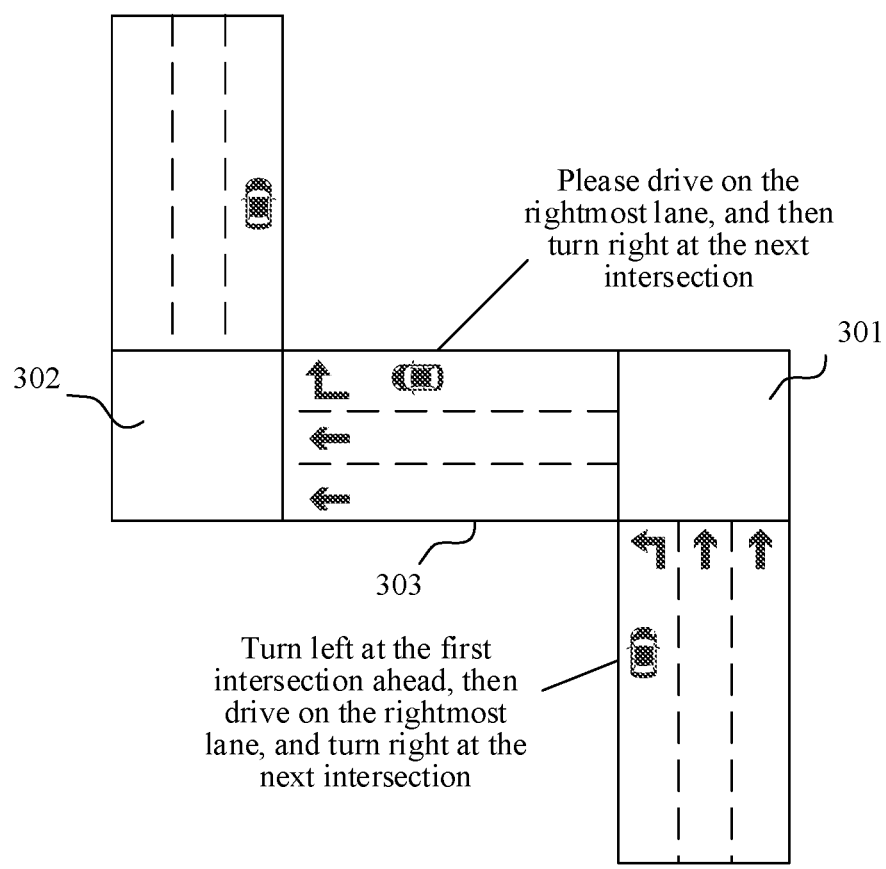
FIG. 3 is a schematic diagram of an exemplary road according to an embodiment of this disclosure.

For example, referring to FIG. 3, there are 3 lanes on the connecting road 303 between the first intersection 301 and the second intersection 302, in which the first and second lanes are straight-through lanes and the third lane is the right-turn lane. When the planned driving direction of a user at the intersection 302 is a right turn, the computer device matches the lane information with the planned driving direction at the intersection 302 to determine that the recommended driving lane is the third lane. Correspondingly, when the planned driving direction of a user at the intersection 302 is straight, the computer device matches the lane information with the planned driving direction at the intersection 302 to determine that the recommended driving lane is the first or second lane.

If the connecting road includes special lanes such as reversible lane and a bus lane, the recommended driving lane may be further determined based on information about traffic rules. The information about traffic rules may include traffic rules for special lanes. For example, the rightmost lane on the connecting road is a bus lane on which a user can drive in the straight direction from 6 a.m. to 9 a.m., and the user may drive in the straight direction on this lane from 6 a.m. to 9 a.m.

The recommended driving lane is determined by the planned driving direction at the second intersection, thus improving the accuracy of the determined recommended driving lane. Since the accuracy of the recommended driving lane is improved, the probability of modifying the recommended driving lane may also be reduced, such that the power and computing resources consumed for modifying the recommended driving lane are saved.

Step 204, generating a navigation prompt message based on the recommended driving lane, the navigation prompt message being used for guiding a user to drive on the recommended driving lane after passing through the first intersection. For example, in response to a determination that the second intersection is located within a distance threshold of the first intersection, a navigation prompt message indicating the recommended driving lane is generated before a vehicle passes through the first intersection. The navigation prompt message guides the vehicle to drive on the recommended driving lane after passing through the first intersection.

The navigation prompt message refers to a prompt message for guiding the driving of users, which may be displayed on the client in the form of characters, graphics, etc., may also be broadcast by the client in the form of voice broadcast, and may also be broadcast by the client in the form of voice broadcast while being displayed thereon in the form of characters, graphics, etc.

During the determination of the recommended driving lane, the computer device may generate a corresponding navigation prompt message according to the recommended driving lane, and send the navigation prompt message to the client, such that the user may, before entering the first intersection, know a lane to be driven into in advance after passing through the first intersection, and furthermore, accurately pass through the second intersection according to the planned driving path, thus reducing the yaw rate of the user.

In an embodiment, the navigation prompt message may be generated by the following specific method, that is, generating a navigation prompt message based on the recommended driving lane includes: generating a first navigation prompt message based on the recommended driving lane, the first navigation prompt message being used for prompting a user to drive on the recommended driving lane after passing through the first intersection.

In an embodiment, generating a navigation prompt message based on the recommended driving lane includes: generating a second navigation prompt message based on the recommended driving lane, the second navigation prompt message being used for prompting a user to not drive on other lanes except for the recommended driving lane after passing through the first intersection.

Figure 4:
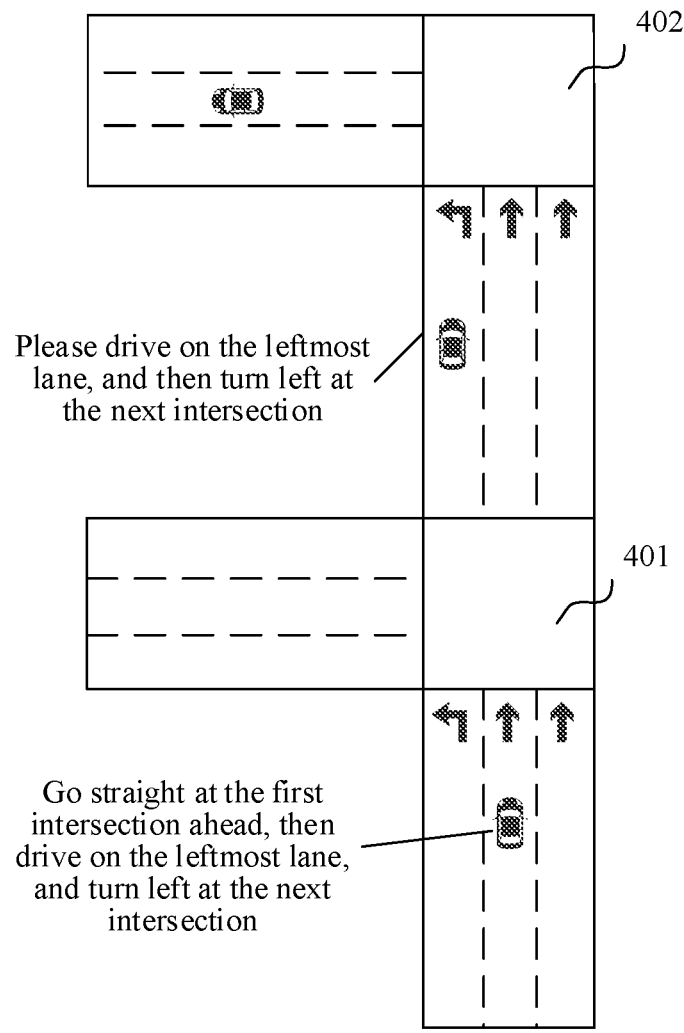
FIG. 4 is a schematic diagram of another exemplary road according to an embodiment of this disclosure.
Figure 5:
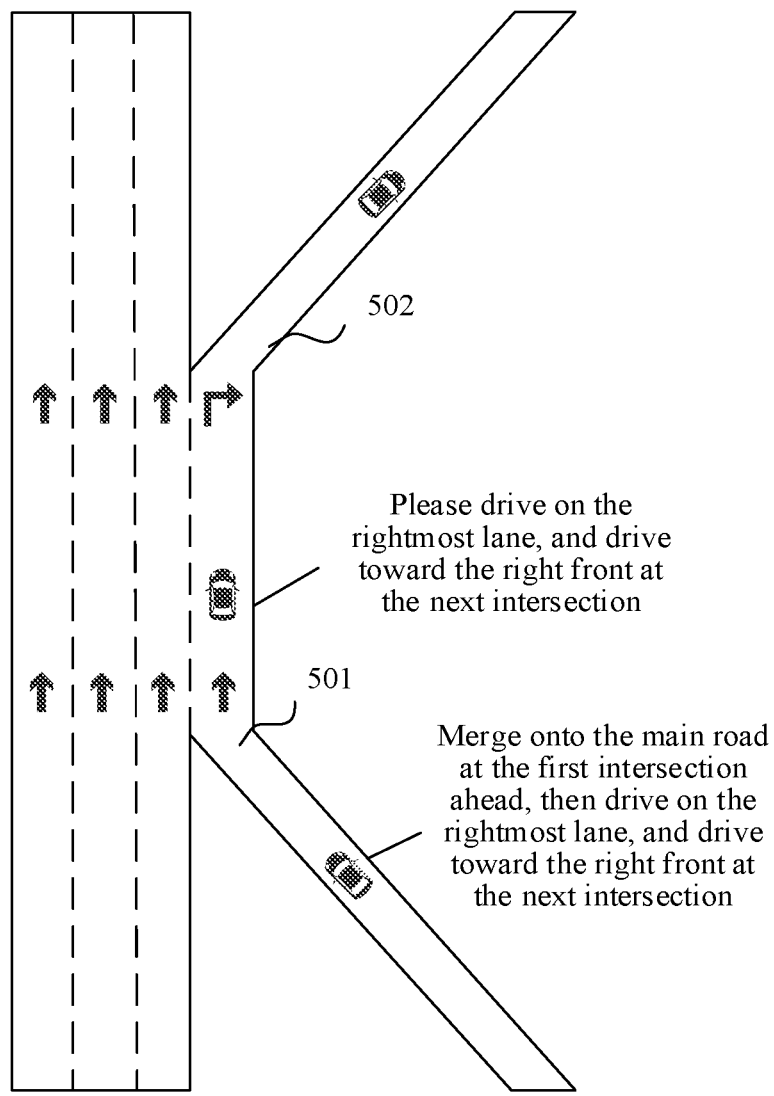
FIG. 5 is a schematic diagram of yet another exemplary road according to an embodiment of this disclosure.
Figure 6:
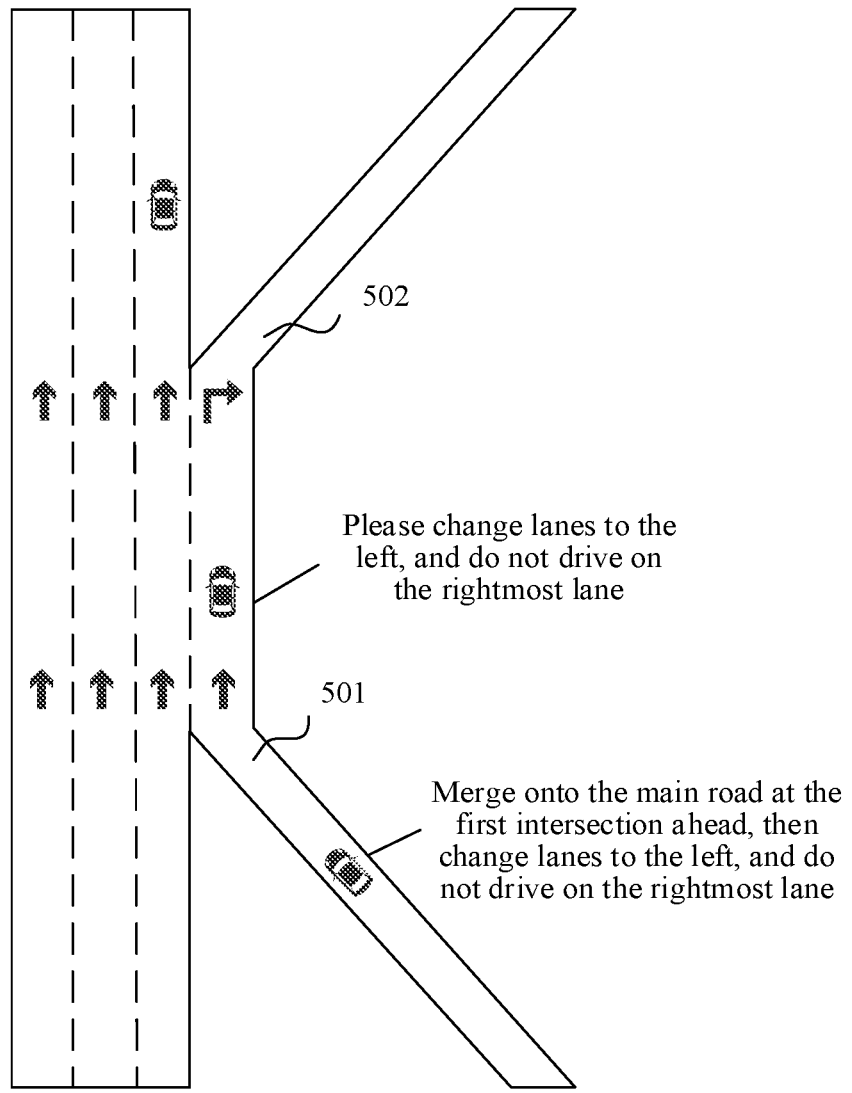
FIG. 6 is a schematic diagram of still another exemplary road according to an embodiment of this disclosure.

The navigation prompt message may be used for prompting the user to drive on the recommended driving lane or not drive on other lanes except for the recommended driving lane. The navigation message may specifically include a first navigation message and a second navigation message, where the first navigation message is used for prompting the user to drive on the recommended driving lane, for example, the content of the first navigation prompt message may be "Please drive on the rightmost lane". The second navigation message is used for prompting the user to not drive on other lanes except for the recommended driving lane, for example, the content of the second navigation prompt message may be "Please change to the left lane and do not drive on the rightmost lane". The navigation prompt message may also include a planned driving direction at the first intersection and a planned driving direction at the second intersection. For example, referring to FIG. 3, in a case that a user needs to turn left at the first intersection 301 and turn right at the second intersection 302, a navigation prompt message generated by the computer device before the user passing through the first intersection 301 may include: Turn left at the first intersection ahead, then drive on the rightmost lane, and turn right at the next intersection. After the user passes through the first intersection, the navigation prompt message generated by the computer device may be updated to: Please drive on the rightmost lane, and then turn right at the next intersection. Alternatively, as shown in FIG. 4, in a case that a user needs to go straight at the first intersection 401 and turn left at the second intersection 402, a navigation prompt message generated by the computer device before the user passing through the first intersection 401 may include: Please go straight at the first intersection ahead, then drive on the leftmost lane, and turn left at the next intersection. After the user passes through the first intersection, the navigation prompt message may be updated to: Please drive on the leftmost lane, and then turn left at the next intersection. Alternatively, as shown in FIG. 5, in a case that a user needs to merge onto a main road at the first intersection 501 and enter a side road at the second intersection 502, a navigation prompt message generated by the computer device before the user passing through the first intersection 501 may include: Please merge onto the main road at the first intersection ahead, then drive on the rightmost lane, and drive toward the right front at the next intersection. After the user merges onto the main road, the navigation prompt message may be updated to: Please drive on the rightmost lane, and drive toward the right front at the next intersection. Still alternatively, as shown in FIG. 6, in a case that a user needs to merges onto the main road at the first intersection 501 and keep going straight on the main road at the second intersection 502, a navigation prompt message generated by the computer device before the user passing through the first intersection 501 may include: Merge onto the main road at the first intersection ahead, then change to the left lane, and do not drive on the rightmost lane. After the user merges onto the main road, the navigation prompt message may be updated to: Please change to the left lane, and do not drive on the rightmost lane.

A first navigation message generated may directly prompt the user to drive on the recommended driving lane, such that the probability of yawing is reduced, and furthermore, resources such as power and petroleum consumed for correcting the yawing are saved. A second navigation message generated may prompt the user to not drive on other lanes except for the recommended driving lane, such that the probability of yawing is further reduced, and furthermore, resources such as power and petroleum consumed for correcting the yawing are saved.

In an embodiment, the planned reminding location corresponding to the navigation prompt message may be determined by the specific method as follows: acquiring an actual driving speed of a vehicle, and an advance reminding duration of the navigation prompt message; taking a road for entering the first intersection in the planned driving path as a target road; determining an estimated driving speed of the vehicle based on the actual driving speed and road attribute information of the target road; and determining a planned reminding location corresponding to the navigation prompt message based on the estimated driving speed and the advance reminding duration of the navigation prompt message, where the planned reminding location refers to a location in the target road, from which the navigation prompt message is sent.

In an embodiment, road attributes refer to types of roads, such as township roads, provincial highways, national highways, and expressways. Speed limits of corresponding roads may be determined based on the road attributes, for example, the speed limit for provincial highways is usually 60 km/h, and that for expressways is usually 120 km/h. The specific speed limits of corresponding roads may be further determined in combination with traffic rules of these roads. For example, the speed limit of some road segments of a provincial highway may be 40 km/h.

The estimated driving speed refers to an estimated driving speed at which the user drives on the target road. For example, in a case that the speed limit of the target road is 60 km/h, when the actual driving speed of a vehicle is smaller than or equal to 60 km/h, the actual driving speed of the vehicle may be determined as the estimated driving speed. Once the actual driving speed of the vehicle is greater than 60 km/h, the driver is reminded of slowing down and the speed limit of the corresponding target road is determined as the estimated driving speed. The target road is a road for entering the first intersection, which is planned in the planned path.

The advance reminding duration is a set countdown duration before a vehicle enters the first intersection, that is, the vehicle enters the first intersection after the advance reminding duration. For example, in a case that the advance reminding duration is set to 10 s, a navigation prompt message is sent at the $10^{th}$ second from the countdown before the vehicle enters the first intersection.

The planned reminding location refers to a location, from which the navigation prompt message is sent. The computer device may obtain the planned reminding location by multiplying the estimated driving speed by the advance reminding duration of the navigation prompt message. For example, assuming that the estimated driving speed of the vehicle is A and the advance reminding duration of the navigation prompt message is B, the planned reminding location is a location which has a distance (A*B) from the first intersection. It may be easily understood that the computer device may send out the navigation prompt message before the vehicle enters the first intersection.

In an embodiment, the vehicle in this disclosure may specifically be an autonomous vehicle. When the navigation prompt message generated according to the lane information is acquired, the vehicle may automatically drive on the recommended driving lane according to this navigation prompt message after passing through the first intersection, without the need of manual driving.

In summary, in the technical solution provided in the embodiments of this disclosure, in a case that there are two adjacent intersections in front of a vehicle driven by a user, based on the lane information of a connecting road between the two intersections, a recommended driving lane corresponding to the connecting road is determined. As a result, the recommended driving lane generated may vary with the lane information, improving the accuracy of the recommended driving lane generated and further saving the power and computing resources consumed for modifying the recommended driving lane. Since the navigation prompt message is generated based on the recommended driving lane, the user may know the recommended driving lane on the connecting road before the vehicle enters the first intersection. On this basis, the vehicle enters the recommended driving lane preparedly after passing through the first intersection, so as to accurately pass through the second intersection according to the planned driving path and avoid yawing due to misjudgment. Therefore, the yaw rate during the driving of the vehicle is sufficiently reduced, and furthermore, the power and computing resources consumed for yaw correction are saved.

In addition, the navigation prompt message includes a prompt message about the recommended driving lane rather than a simple prompt for the planned driving direction, such that the navigation prompt message is more detailed, further reducing the probability of yawing based on the more detailed navigation prompt message.

In addition, the planned reminding location is determined by means of the planned reminding location based on the estimated driving speed and the advance reminding duration of the navigation prompt message. This planned reminding location may be adaptively adjusted with the estimated driving speed and the advance reminding duration of the navigation prompt message, solving the problem that the response duration of the user is insufficient due to the driving speed at a planned reminding location with a fixed value. Furthermore, the yaw rate during the driving of the vehicle is reduced, and furthermore, the power and computing resources consumed for yaw correction are saved.

Figure 7:
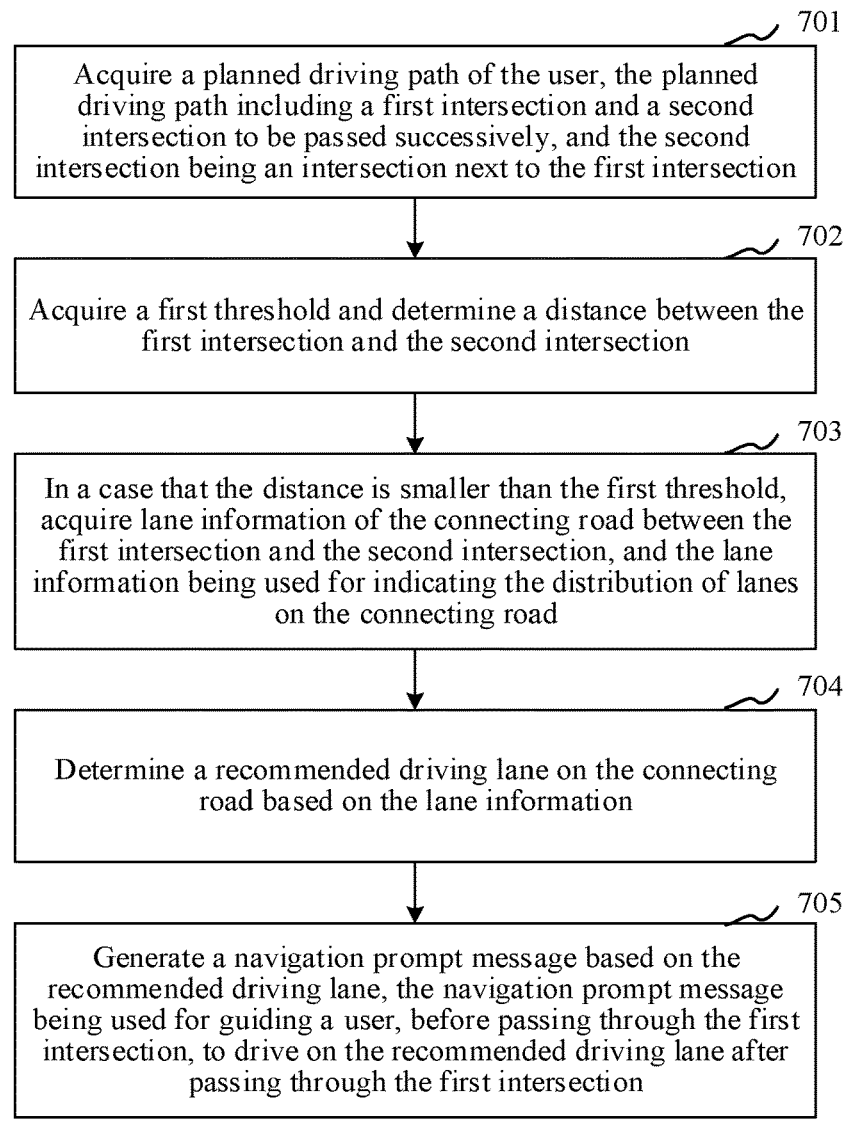
FIG. 7 is a flowchart of a generation method for a navigation prompt message according to another embodiment of this disclosure.

FIG. 7 shows a flowchart of a generation method for a navigation prompt message according to another embodiment of this disclosure. The method may include the following steps (701 to 705):

Step 701, acquiring a planned driving path of the user, the planned driving path including a first intersection and a second intersection to be passed successively, and the second intersection being an intersection next to the first intersection.

The planned driving path may be a driving path for guiding the user to drive from the origin to the destination.

Step 702, acquiring a first threshold and determining a distance between the first intersection and the second intersection.

In an embodiment, Step 702, acquiring the length of a connecting road between the first intersection and the second intersection, where the distance information may be acquired from map data and may also be inquired from the network, which is not limited in the embodiments of this disclosure.

Step 703, in a case that the distance is smaller than the first threshold, acquiring lane information of the connecting road between the first intersection and the second intersection, the lane information being used for indicating the distribution of lanes included on the connecting road.

The first threshold may be set based on whether the user has sufficient time to respond. For example, referring to FIG. 3, in a case that the distance between the first intersection 301 and the second intersection 302 is smaller than the first threshold, there may be no sufficient time for the user to know about lane information and further select a correct driving lane after passing through the first intersection 301. In this case, the navigation prompt message directly guides the user to select the correct driving lane, i.e., the above-mentioned recommended driving lane.

Step 704, determining a recommended driving lane on the connecting road based on the lane information.

Step 705, generating a navigation prompt message based on the recommended driving lane, the navigation prompt message being used for guiding a user, before passing through the first intersection, to drive on the recommended driving lane after passing through the first intersection.

In a case that the distance is smaller than the first threshold, the computer device may acquire the lane information of the connecting road between the first intersection and the second intersection, determine that the vehicle driven by the user is on the recommended driving lane of the connecting road, and generate a navigation prompt message based on the recommended driving lane. Steps 703-705 are the same with or similar to above-mentioned Steps 202-204. Refer to the introduction of the above-mentioned embodiments for details, which are not described in this embodiment.

Since the first threshold is determined based on the response time of the user, in a case that the distance between the first intersection and the second intersection is smaller than the first threshold, it may be considered that the user has no sufficient time to know about the lane information after passing through the first intersection. Therefore, when the navigation prompt message that guides the user to drive in the correct driving lane is directly generated, the probability of yawing due to insufficient time to know about the lane information can be reduced based on the navigation prompt message, thus saving the power resources, gasoline resources and computing resources consumed for correcting the yawing.

In an embodiment, after the operation of determining the distance between the first intersection and the second intersection, the above-mentioned method further includes: in a case that the distance is equal to or greater than a first threshold, acquiring a planned driving direction at the first intersection; and generating a navigation prompt message according to the planned driving direction at the first intersection.

In a case that the distance is equal to or greater than the first threshold, the user has sufficient time to know about the lane information after passing through the first intersection 301, and further selects the correct driving lane. Therefore, the computer device may only acquire the planned driving direction at the first intersection and generate a navigation prompt message based on the planned driving direction at the first intersection. The navigation prompt message is used for prompting the driving operator or user when passing through the first intersection. For example, when the navigation prompt message is: Please turn left at the current intersection, the user performs the driving operation of turning left at this intersection.

The navigation prompt message that directly guides the user to drive on the recommended driving lane and the navigation prompt message including a planned driving direction prompt are generated based on the distance between the first intersection and the second intersection, so that the generated navigation prompt message may be more diverse and more detailed, further reducing the probability of yawing based on the more diverse and more detailed navigation prompt message.

In an embodiment, acquiring lane information of a connecting road between the first intersection and the second intersection includes: determining a distance between the first intersection and the second intersection, and determining an intersection type formed by the first intersection and the second intersection; determining a second threshold corresponding to the intersection type; and in a case that the distance is smaller than the second threshold, acquiring lane information of a connecting road between the first intersection and the second intersection.

After acquiring the planned driving path of the user, the computer device may also begin to perform the following steps: acquiring a distance between the first intersection and the second intersection, and determining an intersection type formed by the first intersection and the second intersection; and in a case that the distance is smaller than the second threshold corresponding to the intersection type, acquiring lane information of the connecting road between the first intersection and the second intersection, the lane information including the distribution of lanes on the connecting road.

The intersection type refers to a special continuous intersection formed by combining the first intersection and the second intersection. For example, the intersection type may be a close-distance continuous turning intersection. Referring to FIG. 3, the user needs to turn left at the first intersection 301 and then turn right at the second intersection 302. The intersection type may be a close-distance "F"-shaped continuous intersection. Referring to FIG. 4, the user needs to go straight at the first intersection 401 and then turn left at the second intersection 402. The intersection type may be a close-distance "K"-shaped continuous intersection. Referring to FIG. 5, the user needs to merge onto the main road at the first intersection 501 and then pull out from the main road at the second intersection 502. Alternatively, as shown in FIG. 6, after merging onto the main road, the user goes straight, without the need of pulling out at the second intersection 502. The intersection type is not limited in the embodiments of this disclosure.

The second threshold corresponding to the intersection type may be set based on the intersection type and whether the user has sufficient time to respond. For example, referring to FIG. 4, the user needs to turn left at the second intersection 402. Since the distance between the first intersection 401 and the second intersection 402 is smaller than the second threshold corresponding to the intersection type, the first intersection 401 may interfere with the user and the user is prone to judge the first intersection 401 as the second intersection 402 by mistake and has no sufficient time to judge a correct intersection and a correct driving lane corresponding to the correct intersection. Also therefore, in a case that the distance is smaller than the second threshold corresponding to the intersection type, the computer device may acquire lane information of a connecting road between the first intersection and the second intersection and generate a navigation prompt message based on the lane information, so as to directly guide the user to select a correct intersection and a correct driving lane based on the navigation prompt message. The second threshold corresponding to different intersection types may be the same or different. For example, in the above-mentioned close-distance continuous turning intersection, the second threshold corresponding to the intersection type may be set to be within 50 m, 45 m, etc. Alternatively, in the above-mentioned close-distance "F"-shaped continuous intersection, the threshold corresponding to the intersection type may be set to be within 200 m, 180 m, etc. In practice, the threshold may be reasonably set according to the response time of the user at different intersections. For example, compared with the intersection type of a "Y"-shaped continuous intersection, the intersection type of the "K"-shaped continuous intersection is more complex and the response time of the user is longer, so that the second threshold corresponding to the "K"-shaped continuous intersection type may be greater than that corresponding to the "Y"-shaped continuous intersection type.

The accuracy of the second threshold determined may be improved when the second threshold is determined by the intersection type, thereby saving the computing resources consumed for modifying the second threshold. By means of the step of acquiring the lane information of the connecting road when the distance is smaller than the second threshold, the navigation prompt message that directly prompts the user to drive on the recommended driving lane may be generated, so that the probability of yawing due to insufficient time to respond can be reduced based on the navigation prompt message, thus saving the power resources and gasoline resources consumed for correcting the yawing.

In an embodiment, after determining the second threshold corresponding to the intersection type, the above-mentioned method further includes: in a case that the distance is equal to or greater than the second threshold, acquiring a planned driving direction at the first intersection; and generating a navigation message according to the planned driving direction at the first intersection.

In a case that the distance is equal to or greater than the second threshold corresponding to the intersection type, the computer device may only need to acquire the planned driving direction at the first intersection, and generate a navigation prompt message according to the planned driving direction at the first intersection. The navigation prompt message is used for prompting the user of driving operation when passing through the first intersection.

In summary, in the technical solution provided in the above-mentioned embodiments, in a case that there are two adjacent intersections in front of a user and the distance is smaller than a threshold, a recommended driving lane corresponding to a connecting lane is determined based on the lane information of the connecting lane between the two intersections, and a navigation prompt message is generated based on the information of the recommended lane. By virtue of the navigation prompt message, the user may know a correct driving lane of the connecting road before entering the first intersection, so that the user may change lanes in time after passing through the first intersection, and pass through the second intersection smoothly, thus reducing the yaw rate during the driving of the user. By means of the step of generating the navigation prompt message according to the planned driving direction at the first intersection when the distance is equal to or greater than a threshold, the user may be prompted of a planned driving direction based on the generated navigation prompt message, so that the user may determine a final driving lane by combining own actual observations for the road and the planned driving direction. As a result, the flexibility of the final driving lane is improved, and furthermore, the yaw rate during the driving of the user is reduced and the computing resources consumed for correcting the yawing are saved.

In addition, judging the distance between the two adjacent intersections implements that advance reminding is performed in necessary situations (insufficient response time of the user), but is not performed in unnecessary situations, thereby ensuring the effectiveness of triggering this advance reminding function.

In addition, for different intersection types, corresponding thresholds are set, so that the thresholds corresponding to the intersection types may be flexibly adjusted, and further be more reasonable.

Figure 8:
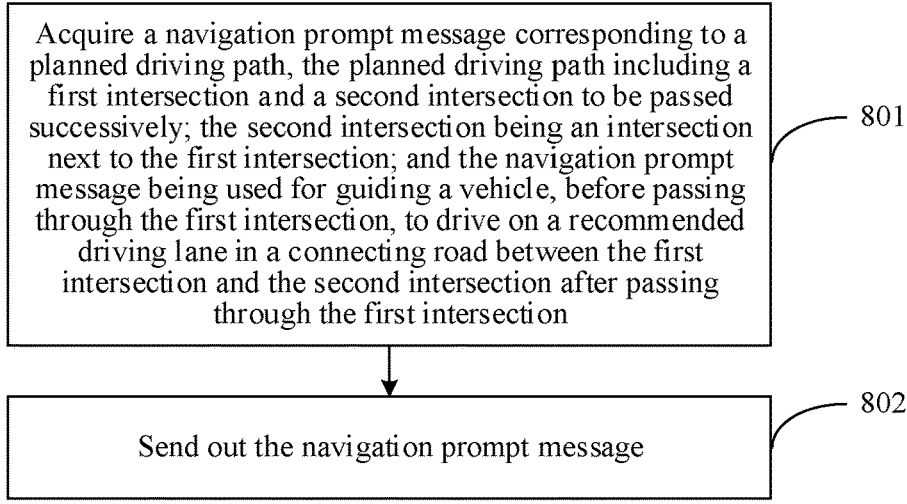
FIG. 8 is a flowchart of a reminding method for a navigation prompt message according to an embodiment of this disclosure.

Please refer to FIG. 8 showing a flowchart of a reminding method for a navigation prompt message according to an embodiment of this disclosure. The method may include the following steps (801 to 802):

Step 801, acquiring a navigation prompt message corresponding to a planned driving path, the planned driving path including a first intersection and a second intersection to be passed successively; the second intersection being an intersection next to the first intersection; and the navigation prompt message being used for guiding a vehicle, before passing through the first intersection, to drive on a recommended driving lane on a connecting road between the first intersection and the second intersection after passing through the first intersection. For example, a navigation prompt message corresponding to a planned driving path is acquired, the planned driving path including a first intersection and a second intersection to be passed successively. The second intersection is located within a distance threshold of the first intersection, and the navigation prompt message is configured to guide a vehicle, before passing through the first intersection, to drive on a recommended driving lane on a connecting road between the first intersection and the second intersection after passing through the first intersection.

The navigation prompt message is used for guiding a user before passing through the first intersection to drive on the recommended driving lane on the connecting road between the first intersection and the second intersection after the user drives the vehicle to pass through the first intersection. The recommended driving lane is a driving lane recommended by the navigation application, which may be used for recommending the user driving on a corresponding lane on the connecting lane.

Based on a guiding method provided by corresponding content in the navigation message, the navigation prompt message may include a first navigation prompt message and a second navigation prompt message: when the navigation prompt message is the first navigation prompt message, the message is used for prompting a user to drive on the recommended driving lane after passing through the first intersection; and alternatively, when the navigation prompt message is the second navigation prompt message, the message is used for prompting a user to not drive on other lanes except for the recommended driving lane after passing through the first intersection. After a variety of navigation prompt messages are generated, not only can the diversity of navigation content be improved based on a variety of navigation prompt messages, but also the probability of yawing may be reduced based on a variety of navigation prompt messages, thus reducing the computing resources consumed for correcting yawing.

In an example, the navigation prompt message may include a planned driving direction at the first intersection, a recommended driving lane on a connecting road between the first intersection and the second intersection, a planned driving direction at the second intersection, etc. For example, one navigation prompt message may be: Go straight at the first intersection ahead, then drive on the leftmost lane, and turn left at the next intersection (i.e., the second intersection). Based on this navigation prompt message, the user may go straight at the first intersection, then drive on the leftmost lane on the connecting road between the first intersection and the second intersection, and finally turn left at the second intersection to pass through the second intersection.

A navigation prompt message may be generated by a server corresponding to a client in a terminal, and may also be generated by the client itself, which is not limited in the embodiments of this disclosure. For example, the server sends the generated navigation prompt message to the client and the client broadcasts the message in real time. Alternatively, the client generates and broadcasts the navigation prompt message by itself.

Step 802, sending out the navigation prompt message. For example, the navigation prompt message is sent out before the vehicle reaches the first intersection.

The terminal may send out a navigation prompt message by the client. The client compares an acquired actual location of the user with the planned driving path of the user to send out a navigation prompt message in real time. For example, after a current location of the user is acquired, a first intersection and a second intersection to be passed subsequently by the user are determined from the planned driving path of the user. A navigation prompt message is sent out before the user enters the first intersection, and a navigation prompt message is sent out after the user passes through the first intersection and before the user enters the second intersection.

A navigation prompt message may be displayed on the client in the form of characters, graphics, etc., and may also be broadcast by the client in the form of voice broadcast, which are not limited by the embodiments in this disclosure. In an embodiment, after a navigation prompt message is sent out, a vehicle may automatically drive on the recommended driving lane on the connecting road between the first intersection and the second intersection according to the navigation prompt message after passing through the first intersection, without the need of the user's manual driving.

In an embodiment, the above-mentioned reminding method for a navigation prompt message further includes: taking a road for entering the first intersection in the planned driving path as a target road, and acquiring a planned reminding location corresponding to the navigation prompt message, the planned reminding location referring to a location in the target road, from which the navigation prompt message is sent, and sending out the navigation prompt message includes: sending out the navigation prompt message when a vehicle arrives at the planned reminding location.

A planned reminding location corresponding to the navigation prompt message is acquired, the planned reminding location referring to a location in the target road, from which the navigation prompt message is sent, and the target road referring to a road on the planned driving path, from which the user enters the first intersection; and a navigation prompt message is sent when the actual location of the user is overlapped with the planned reminding location. The planned reminding location is obtained based on the estimated driving speed and the advance reminding duration of the navigation prompt message.

For example, when the client identifies that the vehicle passes through the first intersection and the second intersection in sequence, a navigation prompt message corresponding to the first intersection and a planned reminding location corresponding to the navigation prompt message are acquired. The reminding location corresponding to the navigation prompt message is a location that is 25 m away from the first intersection. When the client identifies that the actual location of the vehicle is overlapped with the location that is 25 m away from the first intersection, the navigation prompt message is sent out. After the vehicle passes through the first intersection, the client may send out a navigation prompt message corresponding to the second intersection immediately.

The navigation prompt message is sent when the vehicle arrives at the planned reminding location, such that the effectiveness of triggering this advance reminding function may be ensured, and furthermore, the prompting effect of the navigation prompt message is improved, the probability of yawing is reduced, and the computing resources consumed for correcting the yawing are saved.

In summary, in the technical solution provided in the embodiments of this disclosure, in a case that there are two adjacent intersections in front of the vehicle, a navigation prompt message including a recommended driving path corresponding to a connecting road between the two intersections is sent, such that the recommended driving lane on the connecting road may be determined before the vehicle enters the first intersection. On this basis, the vehicle may enter the recommended driving lane preparedly after passing through the first intersection, so as to accurately pass through the second intersection according to the planned driving path and avoid yawing due to mistakes. Therefore, the yaw rate during the driving of the vehicle is sufficiently reduced, and furthermore, the power and computing resources consumed for yaw correction are saved.

In addition, the navigation prompt message includes a prompt message about the recommended driving lane rather than a simple prompt for the planned driving direction, such that the navigation prompt message is more detailed.

The following is apparatus embodiments of this disclosure, which can be used for executing the method embodiments of this disclosure. For details not disclosed in the apparatus embodiments of this disclosure, reference is made to the method embodiments of this disclosure.

Figure 9:
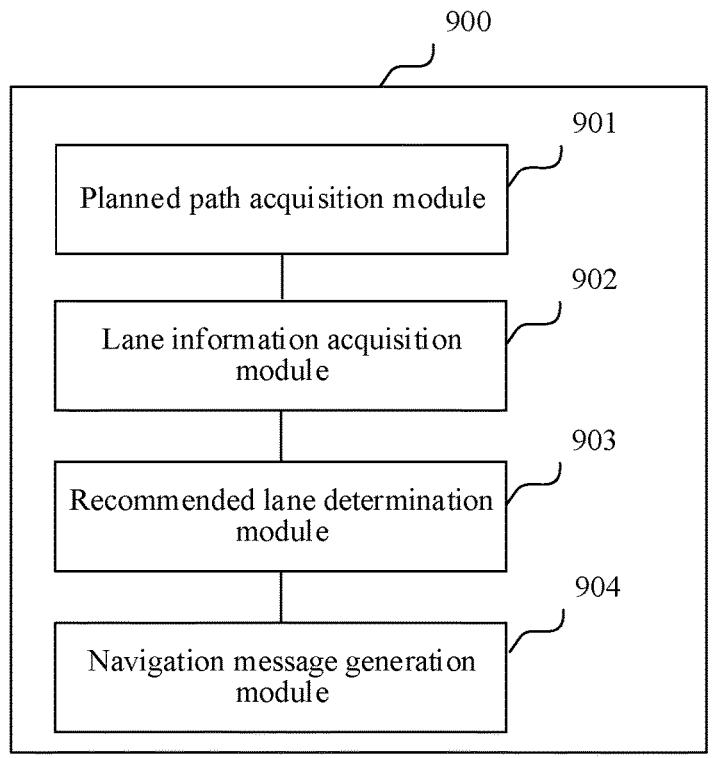
FIG. 9 is a block diagram of a generation apparatus for a navigation prompt message according to an embodiment of this disclosure.

Refer to FIG. 9 showing a block diagram of a generation apparatus for a navigation prompt message according to an embodiment of this disclosure. The apparatus has a function of implementing the foregoing method example, and the function may be implemented by hardware or by hardware executing corresponding software. The apparatus may be the computer device described above, or may be disposed in the computer device (such as terminal or server). As shown in FIG. 9, the apparatus 900 may include: a planned path acquisition module 901, a lane information acquisition module 902, a recommended lane determination module 903, and a navigation message generation module 904.

The planned path acquisition module 901 is configured to acquire a planned driving path, the planned driving path includes a first intersection and a second intersection to be passed successively, and the second intersection is an intersection next to the first intersection.

The lane information acquisition module 902 is configured to acquire lane information of a connecting road between the first intersection and the second intersection, and the lane information includes the distribution of lanes on the connecting road.

The recommended lane determination module 903 is configured to determine a recommended driving lane on the connecting road based on the lane information.

The navigation message generation module 904 is configured to generate a navigation prompt message based on the recommended driving lane, and the navigation prompt message is used for guiding a vehicle, before passing through the first intersection, to drive on the recommended driving lane after passing through the first intersection.

Figure 10:
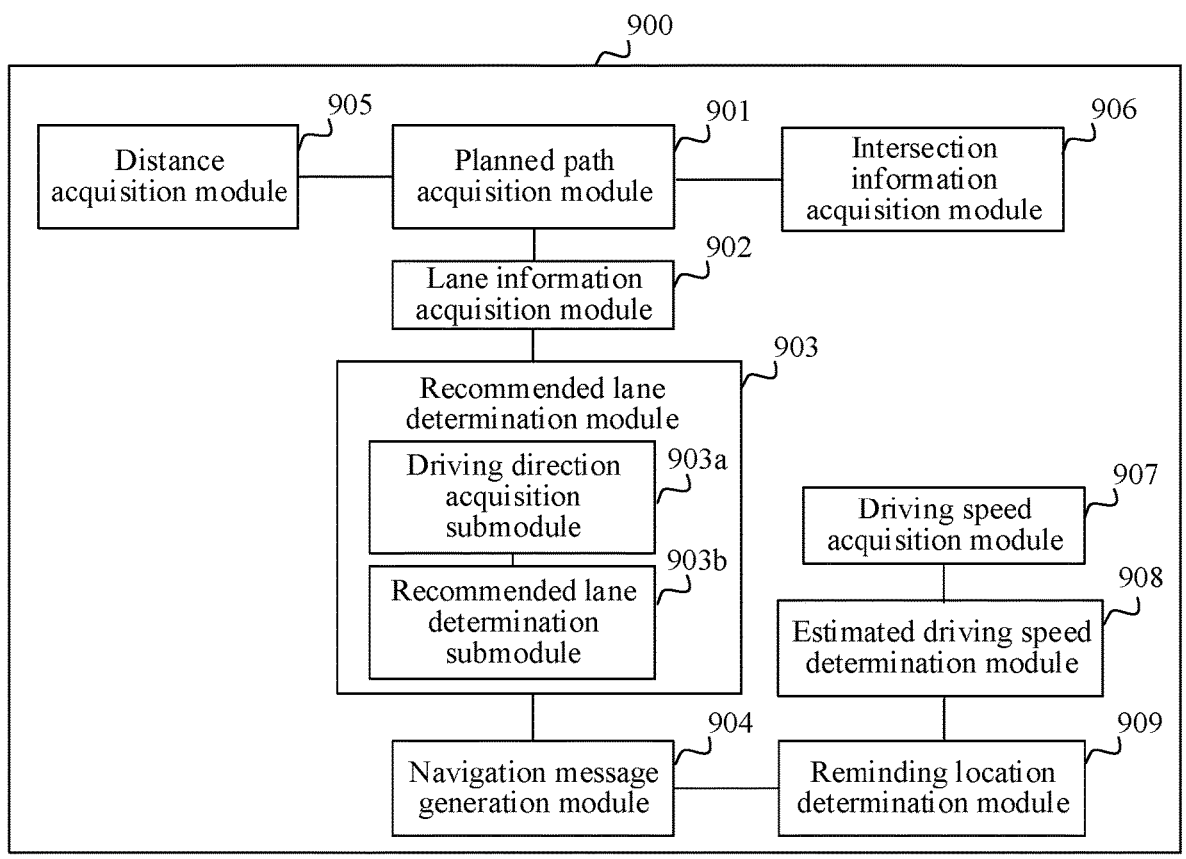
FIG. 10 is a block diagram of a generation apparatus for a navigation prompt message according to another embodiment of this disclosure.

In an exemplary embodiment, as shown in FIG. 10, the recommended lane determination module 903 includes: a driving direction acquisition submodule 903a and a recommended lane determination submodule 903b.

The driving direction acquisition submodule 903a is configured to acquire a planned driving direction at the second intersection.

The recommended lane determination submodule 903b is configured to determine a recommended driving lane on the connecting road based on the lane information and the planned driving direction at the second intersection.

In an exemplary embodiment, the recommended lane determination submodule 903b is configured to:
  if the planned driving direction at the second intersection is a right turn, determine that the recommended driving lane is a right-turn lane on the connecting road;
  if the planned driving direction at the second intersection is a left turn, determine that the recommended driving lane is a left-turn lane on the connecting road;
  if the planned driving direction at the second intersection is straight, determine that the recommended driving lane is a straight-through lane on the connecting road; and
  if the planned driving direction at the second intersection is a U turn, determine that the recommended driving lane is a U-turn lane on the connecting road.

In an exemplary embodiment, the navigation message generation module 904 is configured to:
  generate a first navigation prompt message based on the recommended driving lane, the first navigation prompt message being used for prompting a user to drive on the recommended driving lane after passing through the first intersection.

In an exemplary embodiment, the navigation message generation module 904 is configured to:
  generate a second navigation prompt message based on the recommended driving lane, the second navigation prompt message being used for prompting a user to not drive on other lanes except for the recommended driving lane after passing through the first intersection.

In an exemplary embodiment, as shown in FIG. 10, the apparatus 900 may further include: a distance acquisition module 905.

The distance acquisition module 905 is configured to acquire a first threshold and determine a distance between the first intersection and the second intersection.

The lane information acquisition module 902 is also configured to acquire lane information of a connecting road between the first intersection and the second intersection in a case that the distance is smaller than the first threshold.

In an exemplary embodiment, the apparatus 900 is also configured to acquire a planned driving direction at the first intersection in a case that the distance is equal to or greater than a first threshold; and generate a navigation prompt message according to the planned driving direction at the first intersection.

In an exemplary embodiment, as shown in FIG. 10, the apparatus 900 may further include: an intersection information acquisition module 906.

The intersection information acquisition module 906 is configured to determine a distance between the first intersection and the second intersection, and determine an intersection type formed by the first intersection and the second intersection.

The lane information acquisition module 902 is also configured to determine a second threshold corresponding to the intersection type; and in a case that the distance is smaller than a threshold corresponding to the intersection type, acquire lane information of a connecting road between the first intersection and the second intersection.

In an exemplary embodiment, the lane information acquisition module 902 is also configured to acquire a planned driving direction at the first intersection in a case that the distance is equal to or greater than the second threshold; and generate a navigation message according to the planned driving direction at the first intersection.

In an exemplary embodiment, as shown in FIG. 10, the apparatus 900 may further include: a driving speed acquisition module 907, an estimated speed determination module 908, and a reminding location determination module 909.

The driving speed acquisition module 907 is configured to acquire an actual driving speed of a vehicle, and an advance reminding duration of the navigation prompt message.

The estimated speed determination module 908 is configured to take a road for entering the first intersection in the planned driving path as a target road, and determine an estimated driving speed of the vehicle based on the actual driving speed and road attribute information of the target road.

The reminding location determination module 909 is configured to determine a planned reminding location corresponding to the navigation prompt message based on the estimated driving speed and the advance reminding duration of the navigation prompt message, where the planned reminding location refers to a location in the target road, from which the navigation prompt message is sent.

In summary, in the technical solution provided in the embodiments of this disclosure, in a case that there are two adjacent intersections in front of the vehicle, a recommended driving lane corresponding to a connecting road is determined based on lane information of the connecting road between the two intersections, such that a navigation prompt message is generated based on the recommended driving lane and a recommended driving lane on the connecting road may be determined before the vehicle enters the first intersection. On this basis, the vehicle may enter the recommended driving lane preparedly after passing through the first intersection, so as to accurately pass through the second intersection according to the planned driving path and avoid yawing due to mistakes. Therefore, the yaw rate during the driving of the vehicle is sufficiently reduced.

Figure 11:
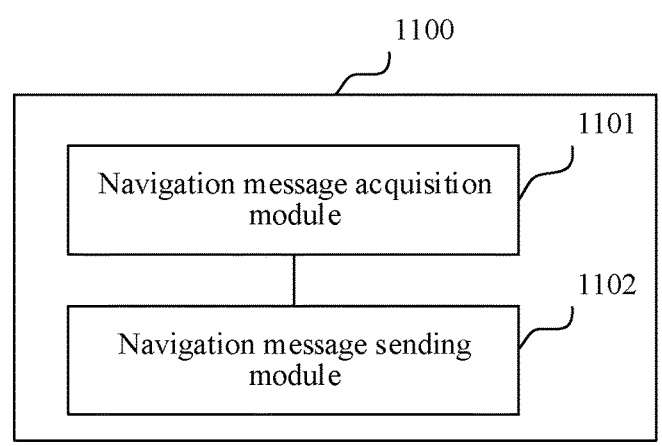
FIG. 11 is a block diagram of a reminding apparatus for a navigation prompt message according to an embodiment of this disclosure.

Refer to FIG. 11 showing a block diagram of a reminding apparatus for a navigation prompt message according to an embodiment of this disclosure. The apparatus has a function of implementing the foregoing method example, and the function may be implemented by hardware or by hardware executing corresponding software. The apparatus may be the terminal described above, or may be disposed in the terminal. As shown in FIG. 11, the apparatus 1100 includes: a navigation message acquisition module 1101 and a navigation message sending module 1102.

The navigation message acquisition module 1101 is configured to acquire a navigation prompt message corresponding to a planned driving path, and the planned driving path includes a first intersection and a second intersection to be passed successively; the second intersection is an intersection next to the first intersection; and the navigation prompt message is used for guiding a vehicle, before passing through the first intersection, to drive on a recommended driving lane on a connecting road between the first intersection and the second intersection after passing through the first intersection.

The navigation message sending module 1102 is configured to send out the navigation prompt message.

Figure 12:
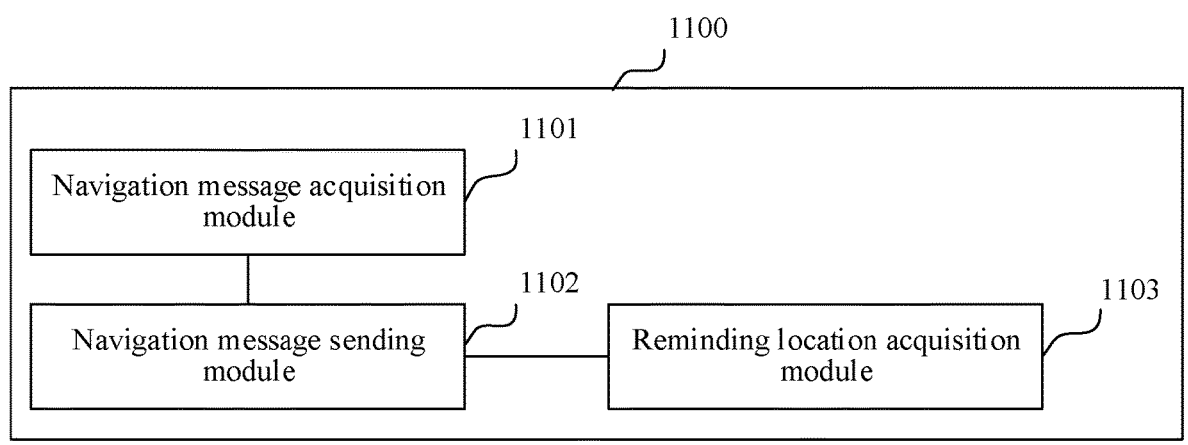
FIG. 12 is a block diagram of a reminding apparatus for a navigation prompt message according to another embodiment of this disclosure.

In an exemplary embodiment, as shown in FIG. 12, the apparatus 1100 further includes: a reminding location acquisition module 1103.

The reminding location acquisition module 1103 is configured to take a road for entering the first intersection in the planned driving path as a target road, and acquire a planned reminding location corresponding to the navigation prompt message, the planned reminding location referring to a location in the target road, from which the navigation prompt message is sent.

The navigation message sending module 1102 is also configured to send out the navigation prompt message when a vehicle arrives at the planned reminding location.

In an exemplary embodiment, the navigation prompt message includes a first navigation prompt message and a second navigation prompt message. The first navigation prompt message is used for prompting a user to drive on the recommended driving lane after passing through the first intersection; and the second navigation prompt message is used for prompting a user to not drive on other lanes except for the recommended driving lane after passing through the first intersection.

In summary, in the technical solution provided in the embodiments of this disclosure, in a case that there are two adjacent intersections in front of the user, a navigation prompt message including a recommended driving path corresponding to a connecting road between the two intersections is sent, such that the recommended driving lane on the connecting road may be known before the user enters the first intersection. On this basis, the user may enter the recommended driving lane preparedly after passing through the first intersection, so as to accurately pass through the second intersection according to the planned driving path and avoid yawing due to mistakes. Therefore, the yaw rate during the driving of the user is sufficiently reduced.

It should be noted that: when the apparatus provided in the foregoing embodiments implements functions of the apparatus, only division of the foregoing function modules is used as an example for description. In the practical application, the functions may be assigned to and completed by different functional modules according to the requirements. That is, an internal structure of the device is divided into different functional modules, to implement all or some of the functions described above. In addition, the apparatus and method embodiments provided in the foregoing embodiments belong to one conception. For the specific implementation process, reference may be made to the method embodiments, and details are not described herein again.

Figure 13:
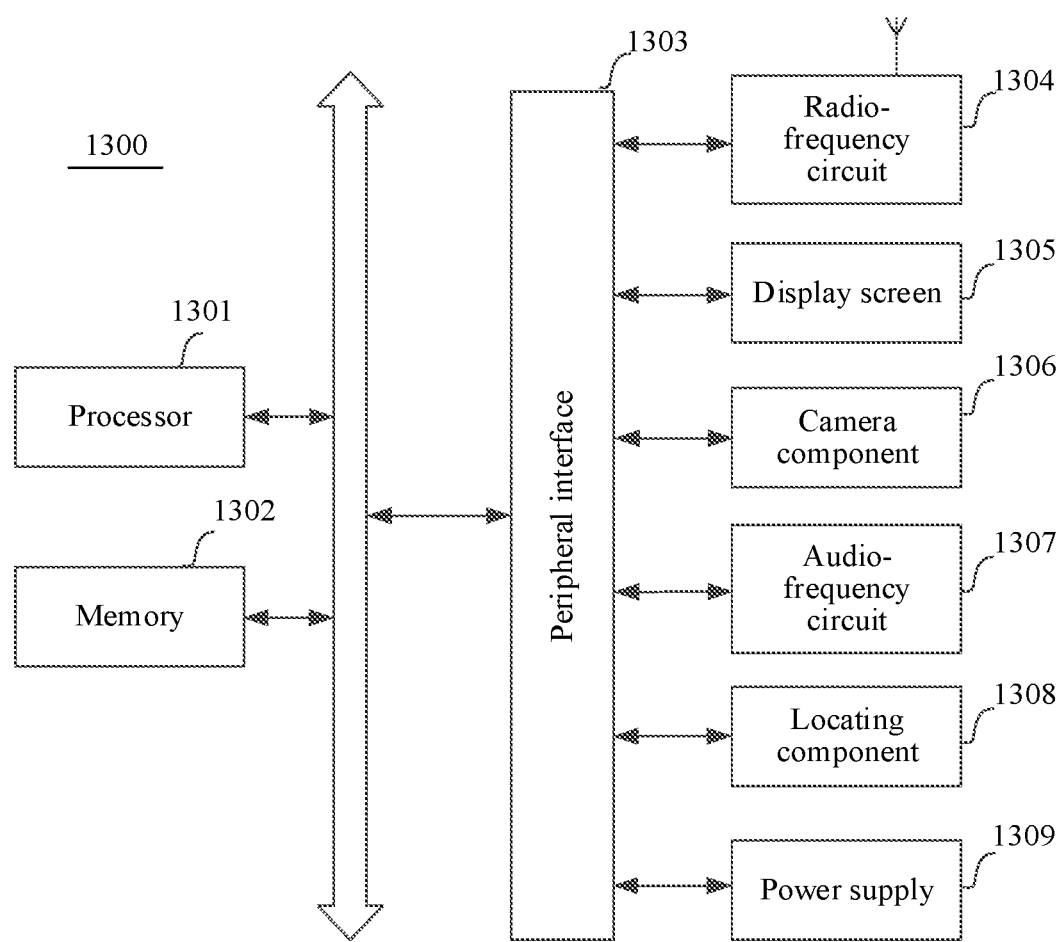
FIG. 13 is a block diagram of a terminal according to an embodiment of this disclosure.

Please refer to FIG. 13 showing a structural block diagram of a terminal 1300 according to an embodiment of this disclosure. The terminal 1300 may be the terminal 10 described above. The terminal 1300 may be configured to implement the above-mentioned generation method for a navigation prompt message or the above-mentioned reminding method for a navigation prompt message. In particular:

Generally, the terminal 1300 includes: a processor 1301 (including processing circuitry) and a memory 1302 (including a non-transitory computer-readable storage medium).

The processor 1301 may include one or more processing cores, such as, a 9-core processor or a 10-core processor. The processor 1301 may be implemented by using at least one hardware form of a digital signal processor (DSP), a field programmable gate array (FPGA), and a programmable logic array (PLA). The processor 1301 may alternatively include a main processor and a coprocessor. The main processor is configured to process data in an active state, also referred to as a central processing unit (CPU). The coprocessor is a low-power processor configured to process data in a standby state. In some embodiments, the processor 1301 may be integrated with a graphics processing unit (GPU). The GPU is configured to be responsible for rendering and drawing content that a display needs to display. In some embodiments, the processor 1301 may further include an artificial intelligence (AI) processor. The AI processor is configured to process a computing operation related to machine learning.

The memory 1302 may include one or more computer-readable storage media that may be non-transitory. The memory 1302 may further include a high-speed random access memory (RAM), and a non-volatile memory such as one or more magnetic disk storage devices or flash storage devices. In some embodiments, the non-transient computer-readable storage medium in the memory 1302 is configured to store a computer program, the computer program being configured to be executed by one or more processors to implement the foregoing generation method for a navigation prompt message and the foregoing reminding method for a navigation prompt message.

In some embodiments, the terminal 1300 may include: a peripheral interface 1303 and at least one peripheral device. The processor 1301, the memory 1302, and the peripheral interface 1303 may be connected through a bus or a signal cable. Each peripheral device may be connected to the peripheral interface 1303 through a bus, a signal cable, or a circuit board. Specifically, the peripheral device includes: at least one of a radio-frequency circuit 1304, a display screen 1305, a camera assembly 1306, a voice-frequency circuit 1307, a locating assembly 1308, and a power supply 1309.

A person skilled in the art may understand that the structure shown in FIG. 13 constitutes no limitation on the terminal 1300, and the terminal may include more or fewer components than those shown in the figure, or some components may be combined, or a different component deployment may be used.

Figure 14:
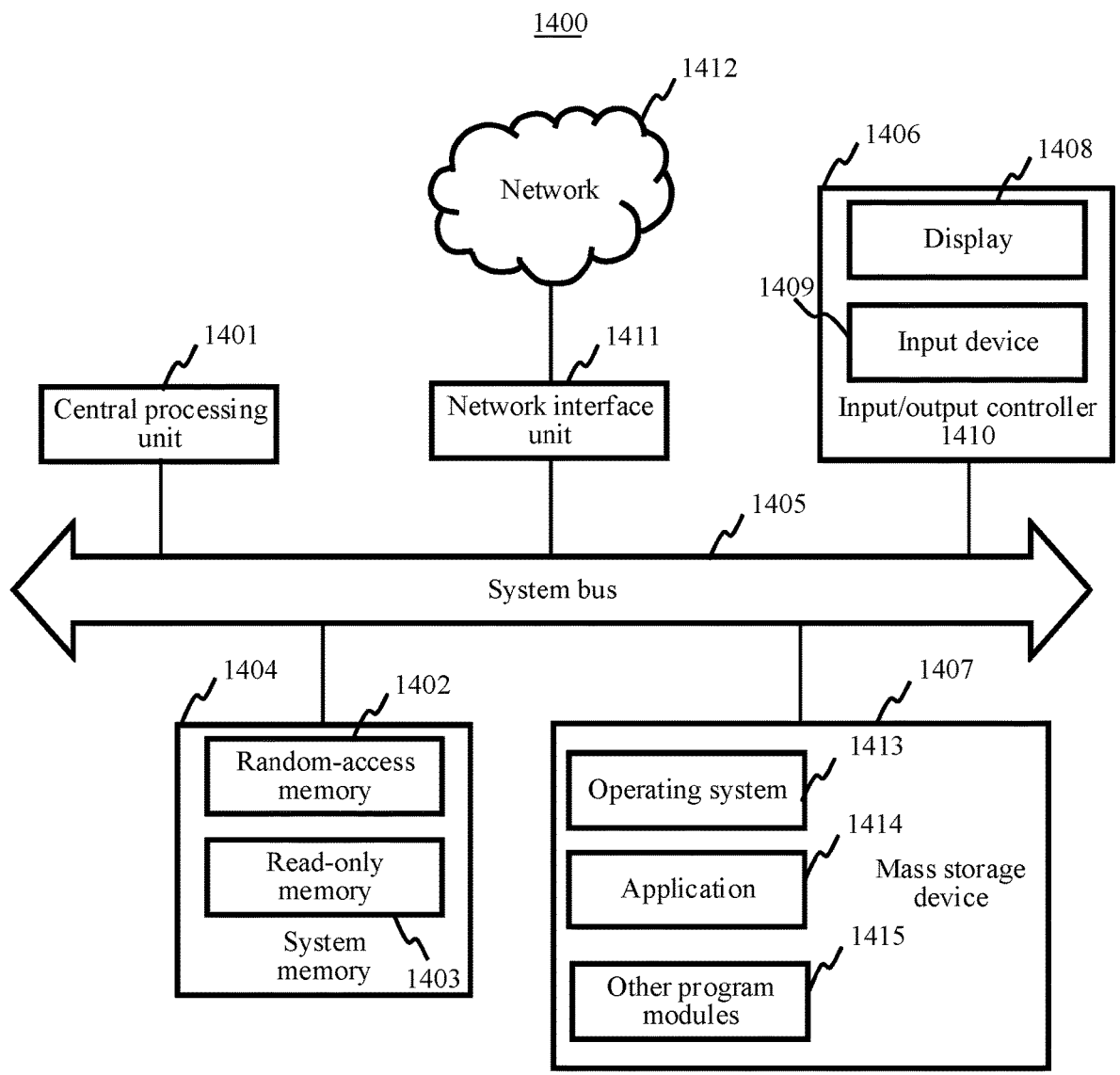
FIG. 14 is a block diagram of a server according to an embodiment of this disclosure.

Please refer to FIG. 14 showing a structural block diagram of a server according to an embodiment of this disclosure. The server may be configured to implement the generation method for a navigation prompt message according to an embodiment of this disclosure. In particular, the server 1400 includes a central processing unit 1401 (such as a central processing unit (CPU), a graphics processing unit (GPU) and a field programmable gate array (FPGA)), a system memory 1404 including a random-access memory (RAM) 1402 and a read-only memory (ROM) 1403, and a system bus 1405 for connecting the system memory 1404 and the central processing unit 1401. The server 1400 further includes a basic input/output (I/O) system 1406 assisting in transmitting information between devices in a server, and a mass storage device 1407 configured to store an operating system 1413, an application program 1414 and another program module 1415.

The basic I/O system 1406 includes a display 1408 configured to display information and an input device 1409 configured to input information by a user, such as a mouse and a keyboard. The display 1408 and the input device 1409 are both connected to the CPU 1401 by using an input/output controller 1410 connected to the system bus 1405. The basic I/O system 1406 may further include the I/O controller 1410 configured to receive and process inputs from a plurality of other devices such as a keyboard, a mouse, or an electronic stylus. Similarly, the I/O controller 1410 further provides an output to a display screen, a printer, or another type of output device.

The mass storage device 1407 is connected to the CPU 1401 by using a mass storage controller (not shown) connected to the system bus 1405. The mass storage device 1407 and its associated computer-readable medium provide non-volatile storage for the server 1400. That is, the mass storage device 1407 may include a computer-readable medium (not shown) such as a hard disk or a compact disc read only memory (CD-ROM) drive.

Without loss of generality, the computer-readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an erasable programmable ROM (EPROM), an electrically erasable programmable ROM (EEPROM), a flash memory or another solid-state memory technology, CD-ROM, a digital versatile disc (DVD) or another optical memory, a tape cartridge, a magnetic cassette, a magnetic disk memory, or another magnetic storage device. Certainly, a person skilled in the art can know that the computer storage medium is not limited to the foregoing several types. The foregoing system memory 1404 and the mass storage device 1407 may be collectively referred to as a memory.

According to this disclosure, the server 1400 may further be connected, by using a network such as the Internet, to a remote computer on the network and run. That is, the server 1400 may be connected to a network 1412 by using a network interface unit 1411 connected to the system bus 1405, or may be connected to another type of network or remote computer system (not shown) by using the network interface unit 1411.

The memory further includes a computer program. The computer program is stored in the memory and configured to be executed by one or more processors, to implement the foregoing generation method for a navigation prompt message.

In an exemplary embodiment, a computer-readable storage medium is further provided, the storage medium storing at least one instruction, at least one program, a code set, or an instruction set, the at least one instruction, the at least one program, the code set, or the instruction set, when executed by a terminal or a processor of a server, implementing the foregoing generation method for a navigation prompt message.

In an exemplary embodiment, a computer-readable storage medium is further provided, the storage medium storing at least one instruction, at least one program, a code set, or an instruction set, the at least one instruction, the at least one program, the code set, or the instruction set, when executed by a processor of a terminal, implementing the foregoing reminding method for a navigation prompt message.

The computer-readable storage medium may include: a read-only memory (ROM), a RAM, a solid state drive (SSD), an optical disc, or the like. The RAM may include a resistance random access memory (ReRAM) and a dynamic random access memory (DRAM).

In an exemplary embodiment, a computer program product or a computer program is provided. The computer program product or the computer program includes computer instructions, and the computer instructions are stored in a computer-readable storage medium. A processor of the computer device reads the computer instructions from the computer-readable storage medium and executes the computer instructions, causing the computer device to perform the foregoing generation method for a navigation prompt message and the foregoing reminding method for a navigation prompt message.

In an embodiment, a non-transitory computer-readable storage medium stores computer-readable instructions which, when executed by a computer device, cause the computer device to perform a generation method for a navigation prompt message. Th method includes acquiring a planned driving path, the planned driving path comprising a first intersection and a second intersection to be passed successively. The method further includes, in response to a determination that the second intersection is located within a distance threshold of the first intersection, acquiring lane information of a connecting road between the first intersection and the second intersection. The lane information includes a distribution of lanes on the connecting road and at least one driving restriction corresponding to at least one of the lanes on the connecting road. In response to a determination that the second intersection is located within a distance threshold of the first intersection, the method further includes determining a recommended driving lane on the connecting road based on the lane information, and generating, before a vehicle passes through the first intersection, a navigation prompt message indicating the recommended driving lane, the navigation prompt message guiding the vehicle to drive on the recommended driving lane after passing through the first intersection.

In an embodiment, a non-transitory computer-readable storage medium stores computer-readable instructions which, when executed by a computer device, cause the computer device to perform a method for sending a navigation prompt message. The method includes acquiring a navigation prompt message corresponding to a planned driving path, the planned driving path includes a first intersection and a second intersection to be passed successively. The second intersection is located within a distance threshold of the first intersection, and the navigation prompt message is configured to guide a vehicle, before passing through the first intersection, to drive on a recommended driving lane on a connecting road between the first intersection and the second intersection after passing through the first intersection. The method further includes sending out the navigation prompt message before the vehicle reaches the first intersection.

It should be understood that "plurality of" mentioned in this specification means two or more. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this disclosure.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A generation method for a navigation performed by processing circuitry, the method comprising:
    acquiring a planned driving path, the planned driving path comprising a first intersection and a second intersection to be passed successively;
    determining, a distance between the first intersection and the second intersection;
    in response to the determined distance between the first intersection and the second intersection being less than a distance threshold,
        acquiring lane information of a connecting road between the first intersection and the second intersection, the lane information including a distribution of lanes on the connecting road and at least one driving restriction corresponding to at least one of the lanes on the connecting road;
        determining a recommended driving lane on the connecting road between the first intersection and the second intersection based on the lane information and a planned driving direction at the second intersection;
        generating, before a vehicle passes through the first intersection, the navigation prompt message indicating the recommended driving lane, the navigation prompt message guiding a driver of the vehicle to drive on the recommended driving lane; and
        outputting the navigation prompt message to the driver of the vehicle.

2. The method according to claim 1, wherein the determining the recommended driving lane on the connecting road comprises:
    when the planned driving direction at the second intersection is a right turn, determining that the recommended driving lane is a right-turn lane on the connecting road;
    when the planned driving direction at the second intersection is a left turn, determining that the recommended driving lane is a left-turn lane on the connecting road;

when the planned driving direction at the second intersection is straight, determining that the recommended driving lane is a straight-through lane on the connecting road; and when the planned driving direction at the second intersection is a U turn, determining that the recommended driving lane is a U-turn lane on the connecting road.

3. The method according to claim 1, wherein the generating comprises:
generating a first type of navigation prompt message indicating the recommended driving lane, the first type of navigation prompt message prompting the driver of the vehicle to drive in the recommended driving lane after passing through the first intersection.

4. The method according to claim 1, wherein the generating comprises:
generating a second type of navigation prompt message indicating the recommended driving lane, the second type of navigation prompt message prompting the driver of the vehicle to not drive on lanes other than the recommended driving lane after passing through the first intersection.

5. The method according to claim 1, wherein the method further comprises:
in response to a determination that the determined distance is equal to or greater than the distance threshold, acquiring a planned driving direction at the first intersection; and
generating a third type of navigation prompt message according to the planned driving direction at the first intersection.

6. The method according to claim 1, wherein the method further comprises, after the acquiring the planned driving path:
determining the distance between the first intersection and the second intersection, and determining an intersection type formed by the first intersection and the second intersection;
determining a second distance threshold corresponding to the intersection type; and
in response to a determination that the determined distance is less than the second distance threshold,
acquiring the lane information of the connecting road between the first intersection and the second intersection,
determining the recommended driving lane on the connecting road, and
generating the navigation prompt message indicating the recommended driving lane.

7. The method according to claim 6, wherein the method further comprises:
in response to a determination that the determined distance is equal to or greater than the second distance threshold, acquiring a planned driving direction at the first intersection; and
generating a fourth type of navigation prompt message according to the planned driving direction at the first intersection.

8. The method according to claim 1, wherein the method further comprises:
acquiring an actual driving speed of the vehicle, and an advance reminding duration of the navigation prompt message;
determining an estimated driving speed of the vehicle based on the actual driving speed and road attribute information of a road for entering the first intersection in the planned driving path; and determining a planned reminding location corresponding to the navigation prompt message based on the estimated driving speed and the advance reminding duration of the navigation prompt message, wherein the planned reminding location is a location on the road for entering the first intersection in the planned driving path, such that the navigation prompt message is sent when the vehicle reaches the planned reminding location.

9. The method according to claim 8, wherein the method further comprises:
sending out the navigation prompt message when the vehicle arrives at the planned reminding location.

10. The method according to claim 8, wherein the navigation prompt message comprises a first type of navigation message and a second type of navigation message;
the first type of navigation message prompts the driver of the vehicle to drive in the recommended driving lane after passing through the first intersection; and
the second type of navigation message prompts the driver of the vehicle to not drive in lanes other than the recommended driving lane after passing through the first intersection.

11. A method for sending a navigation performed by processing circuitry, the method comprising:
acquiring a planned driving path, the planned driving path comprising a first intersection and a second intersection to be passed successively;
determining, a distance between the first intersection and the second intersection;
in response to the determined distance between the first intersection and the second intersection being less than a distance threshold, acquiring the navigation prompt message corresponding to the planned driving path, the navigation prompt message indicating a recommended driving lane on a connecting road between the first intersection and the second intersection, the recommended driving lane being determined based on lane information of the connecting road and a planned driving direction at the second intersection, the lane information comprising a distribution of lanes on the connecting road and at least one driving restriction corresponding to at least one of the lanes on the connecting road, and the navigation prompt message being configured to guide a driver of a vehicle, before passing through the first intersection, to drive on the recommended driving lane on the connecting road between the first intersection and the second intersection; and
sending out the navigation prompt message before the vehicle reaches the first intersection.

12. A generation apparatus for a navigation prompt message, the apparatus comprising:
processing circuitry configured to
acquire a planned driving path, the planned driving path comprising a first intersection and a second intersection to be passed successively;
determine a distance between the first intersection and the second intersection;
in response to the determined distance between the first intersection and the second intersection being less than a distance threshold,
acquire lane information of a connecting road between the first intersection and the second intersection, the lane information including a distribution of lanes on the connecting road and at least one driving restriction corresponding to at least one of the lanes on the connecting road;

determine a recommended driving lane on the connecting road between the first intersection and the second intersection based on the lane information and a planned driving direction at the second intersection;

generate, before a vehicle passes through the first intersection, the navigation prompt message indicating the recommended driving lane, the navigation prompt message guiding a driver of the vehicle to drive on the recommended driving lane; and output the navigation prompt message to the driver of the vehicle.

13. The apparatus according to claim 12, wherein the processing circuitry is further configured to:

acquire an actual driving speed of the vehicle, and an advance reminding duration of the navigation prompt message;

determine an estimated driving speed of the vehicle based on the actual driving speed and road attribute information of a road for entering the first intersection in the planned driving path; and determine a planned reminding location corresponding to the navigation prompt message based on the estimated driving speed and the advance reminding duration of the navigation prompt message, wherein the planned reminding location is a location on the road for entering the first intersection in the planned driving path, such that the navigation prompt message is sent when the vehicle reaches the planned reminding location.

14. The apparatus according to claim 12, wherein the processing circuitry is further configured to:

when the planned driving direction at the second intersection is a right turn, determine that the recommended driving lane is a right-turn lane on the connecting road;

when the planned driving direction at the second intersection is a left turn, determine that the recommended driving lane is a left-turn lane on the connecting road;

when the planned driving direction at the second intersection is straight, determine that the recommended driving lane is a straight-through lane on the connecting road; and when the planned driving direction at the second intersection is a U turn, determine that the recommended driving lane is a U-turn lane on the connecting road.

15. The apparatus according to claim 12, wherein the processing circuitry is further configured to:

generate a first type of navigation prompt message indicating the recommended driving lane, the first type of navigation prompt message prompting the driver of the vehicle to drive in the recommended driving lane after passing through the first intersection.

16. The apparatus according to claim 12, wherein the processing circuitry is further configured to:

generate a second type of navigation prompt message indicating the recommended driving lane, the second type of navigation prompt message prompting the driver of the vehicle to not drive on lanes other than the recommended driving lane after passing through the first intersection.

\* \* \* \* \*